April 12, 1966   R. WICK ETAL   3,245,309
LIGHT-MEASURING STRUCTURE FOR PHOTOGRAPHIC DEVICES
Filed March 4, 1963   4 Sheets-Sheet 1

INVENTOR.
RICHARD WICK
JÜRGEN ORTHMANN
BY
Michael S. Striker
ATTORNEY

April 12, 1966 R. WICK ETAL 3,245,309
LIGHT-MEASURING STRUCTURE FOR PHOTOGRAPHIC DEVICES
Filed March 4, 1963 4 Sheets-Sheet 2

INVENTOR.
RICHARD WICK
JÜRGEN ORTHMANN
BY Michael S Striker
ATTORNEY

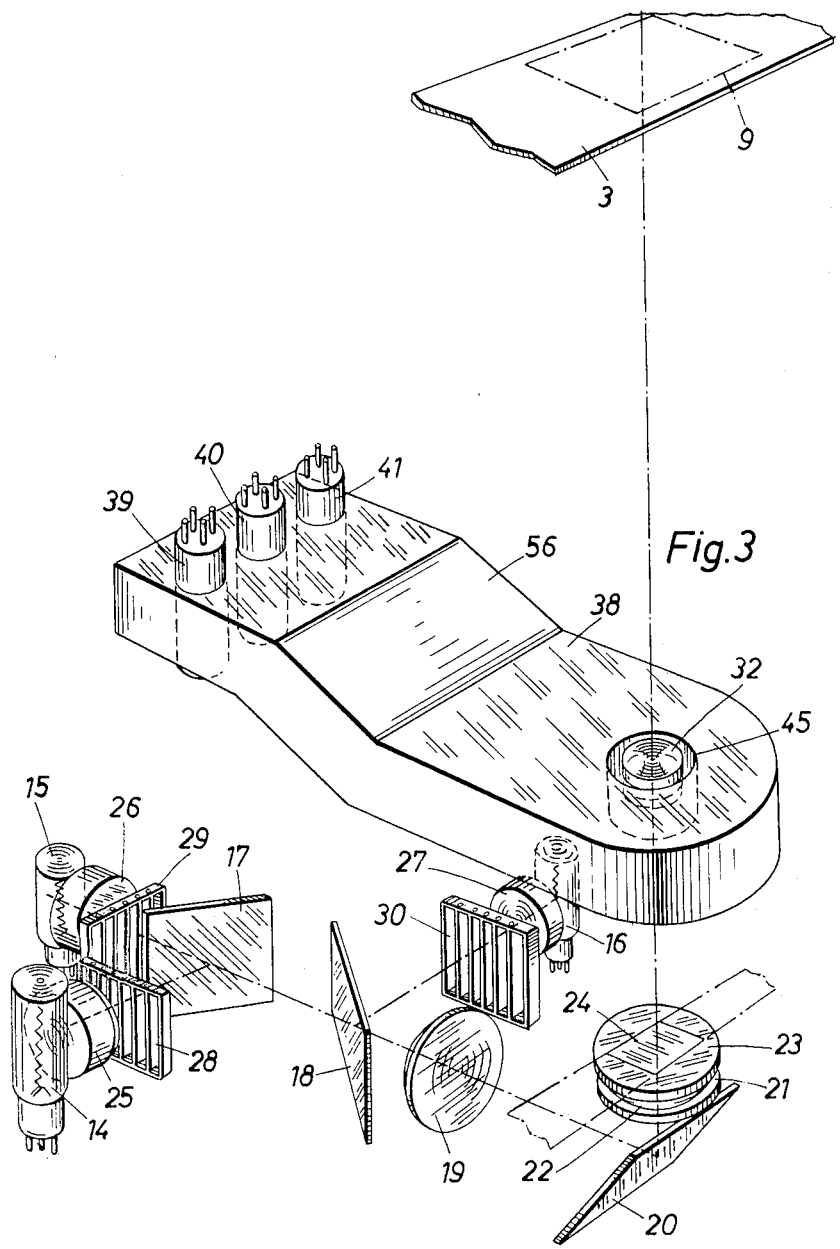

April 12, 1966 R. WICK ETAL 3,245,309
LIGHT-MEASURING STRUCTURE FOR PHOTOGRAPHIC DEVICES
Filed March 4, 1963 4 Sheets-Sheet 4
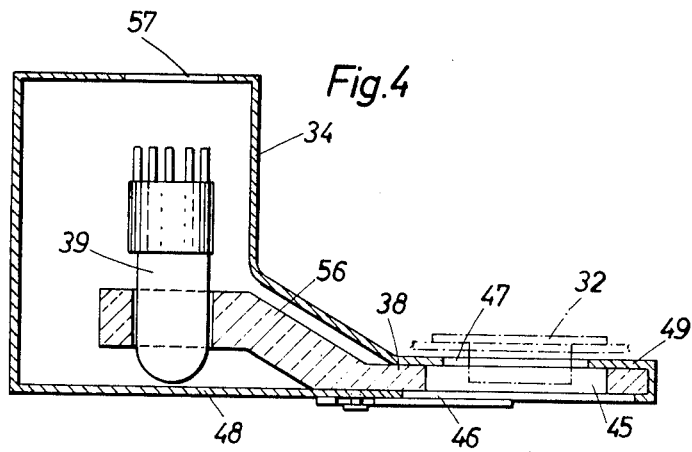
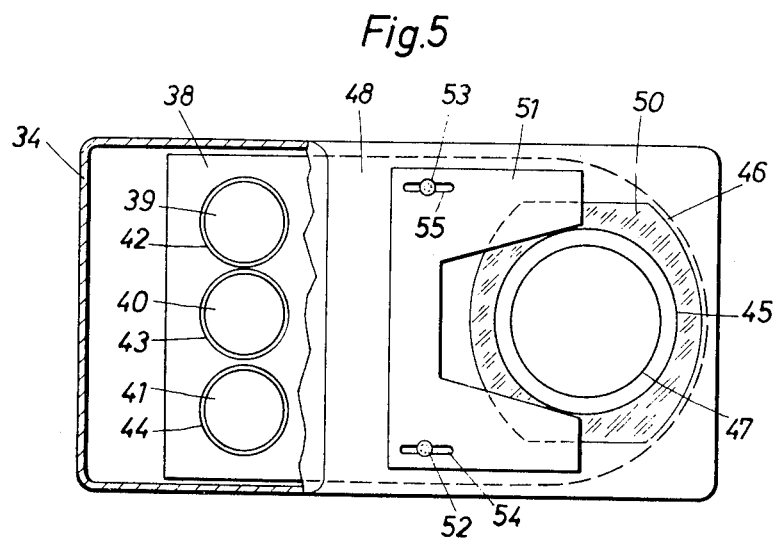
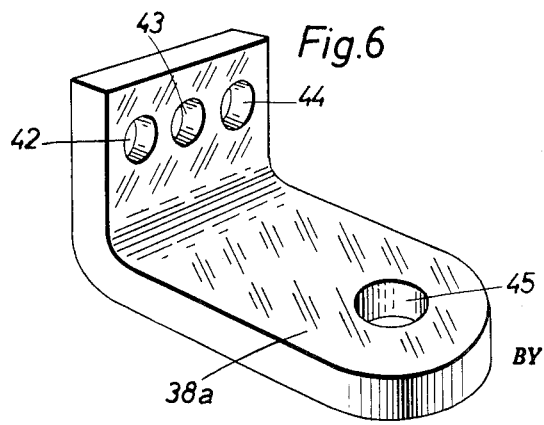
INVENTOR.
RICHARD WICK
JÜRGEN ORTHMANN
BY Michael S. Striker
ATTORNEY

United States Patent Office 3,245,309
Patented Apr. 12, 1966

3,245,309
LIGHT-MEASURING STRUCTURE FOR
PHOTOGRAPHIC DEVICES
Richard Wick and Jurgen Orthmann, Gruenwald, near Munich, Germany, assignors to Agfa Aktiengesellschaft, Leverkusen, Germany
Filed Mar. 4, 1963, Ser. No. 262,533
Claims priority, application Germany, Mar. 6, 1962, A 39,632
13 Claims. (Cl. 88—24)

The present invention relates to photographic apparatus.

More particularly, the present invention relates to light-measuring assemblies for photographic apparatus.

Various types of photographic apparatus have light-measuring assemblies which are used to control the photographic apparatus. Thus, in photographic devices such as enlargers which make photographic prints or projectors, light-measuring devices are used to measure the light passing through a negative, transparency, diapositive, or the like, and in accordance with this light measurement various elements of the photographic apparatus can be automatically controlled.

Difficulties are involved with an apparatus of the above type in the measurement of the light which passes through the negative, transparency, diapositive or the like. Where the light-measuring structure extends into the path of the light extending from the negative, transparency, or the like to the objective, there is, of course, an undesirable direct interference with the light which passes through the objective, and such interference is highly undesirable. On the other hand, if measurement is made of the light before it passes through the negative, transparency, or the like, then of course there are certain inherent inaccuracies since the light in this case is completely uninfluenced by the negative, transparency, diapositive, or the like. While attempts have already been made to use for light measuring purposes the additional light which is in the immediate vicinity of the light which passes through the objective, these attempts heretofore have resulted in extremely complex, cumbersome structures requiring a considerable amount of apparatus and greatly increasing the size of the entire apparatus.

It is accordingly a primary object of the present invention to provide a structure of the above type with a light-measuring assembly which can control the photographic apparatus by measuring the additional light in the immediate vicinity of the light which passes through the objective but which is extremely simple and compact and does not undesirably increase the size of the entire apparatus.

It is also an object of the present invention to provide a structure of the above type which can easily be added to existing apparatus.

It is also an object of the present invention to provide a light-measuring assembly of the above type which is provided with an adjusting structure enabling the assembly to be very easily and quickly adjusted so as to provide measurements which are of a high order of accuracy.

Also, it is an object of the present invention to provide a structure of the above type capable of being used with apparatus for providing color photographic reproductions so that with the structure of the invention it is possible to measure three different basic colors while at the same time maintaining the structure extremely simple and compact.

With the above objects in view the invention includes, in a light-measuring assembly for a photographic apparatus, an objective and a light-directing means which is located at least in part along the optical axis of the objective and which directs light through the objective, this light-directing means providing additional light located in the immediate vicinity of the light which passes through the objective. A photocell is laterally spaced from the optical axis, and a light-conducting means extends from the region of the photocell into the path of the additional light for receiving at least some of the additional light and conducting it to the photocell so that the photocell can participate in the light-measuring operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is an exploded perspective view illustrating details of the structure of the invention;

FIG. 4 is a longitudinal sectional elevation of the light-conducting means of the present invention shown in association with an objective and a photocell;

FIG. 5 is a view of the structure of FIG. 4 as seen from the underside of FIG. 4; and FIG. 6 is a perspective illustration of another embodiment of a light-conducting means according to the present invention.

Figure 1:
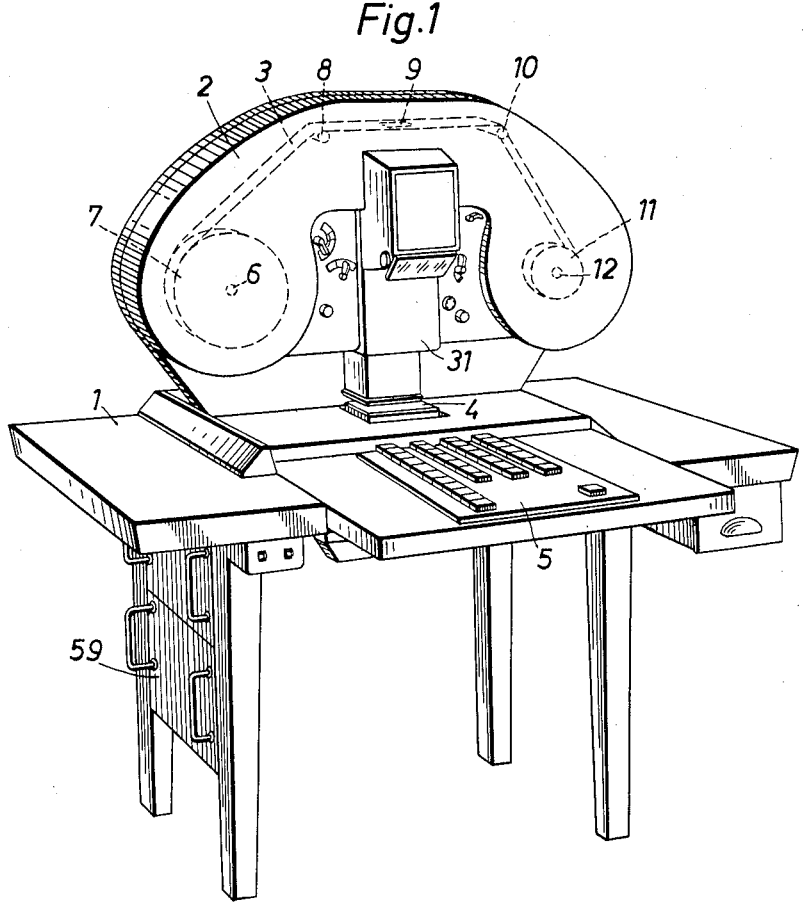
FIG. 1 is a diagrammatic illustration of a photographic reproducing apparatus to which the structure of the invention is applied.

FIG. 1 illustrates a device for making photographic color reproductions, this device being of a well known type and including a worktable 1, a housing 2 which receives the band of copy paper 3, support 4 for the negative, transparency, diapositive, or the like which is to be reproduced, and a keyboard 5. The band of light-sensitive printing paper 3 is withdrawn from a supply spool 7 which is turnable about the shaft 6, and this band 3 passes over a guide roller 8 to the exposure aperture 9 through which the light-sensitive surface of the band 3 is exposed, and then the copy paper travels after exposure over the guide roller 10 to a suitable take-up spool 11 which is supported by a shaft 12.

Figure 2:
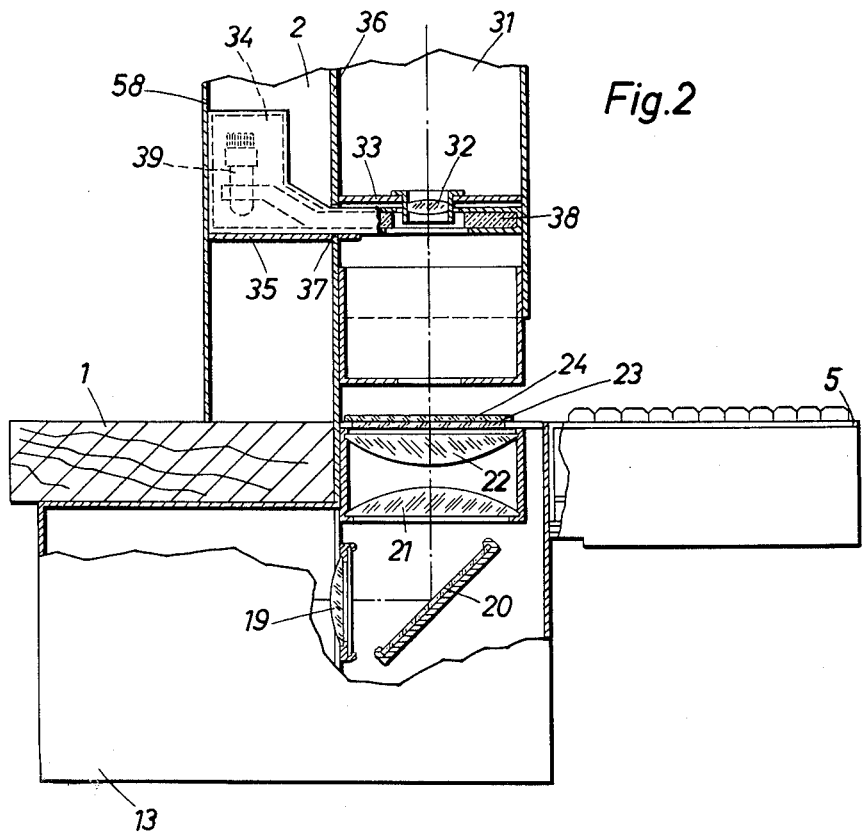
FIG. 2 is a fragmentary, partly sectional side elevation of that part of the structure of FIG. 1 which is provided with the elements of the present invention.

As is apparent from FIG. 2, a housing 13 is located beneath and carried by the worktable 1, and in this housing 13 is located the exposure-controlling structure for making the color reproductions, this structure being illustrated in greater detail in FIG. 3. Referring to FIG. 3, the exposure-controlling structure includes three lamps 14, 15, and 16 whose light rays are superimposed on each other through the semi-transparent reflectors 17 and 18, and the light from these lamps is then conveyed through a condenser lens 19 and the reflector 20 up through the condenser lenses 21 and 22 through the transparent plate 23 of the support 4 for the negative or the like which is to be reproduced. The color film 24 or the like which is to be reproduced is located on the transparent plate 23.

In front of the lamp 14 is located a lens 25 having a red filter, while a lens 26 having a green filter is located in front of the lamp 15, and a lens 27 having a blue filter is located in front of the lamp 16, so that the lamps 14–16 serve, respectively, to provide red light, green light, and blue light. These color filters can be omitted if, instead of providing semi-transparent reflectors 17 and 18, suitable, overlapping interference filters are used in a manner well known in the art. In the path of the light rays emanating from the three lamps 14–16 there are also electromagnetically actuated jalousie-shutters 28–30, respectively.

The housing 2 includes an elongated hollow tubular structure 31 through which the light is adapted to pass for making the reproductions, and in the tubular enclosure 31 is located the objective 32 which projects onto the copy paper, at the exposure window 9, an image derived from the negative or the like which is located on the plate 23. The objective 32 is carried by a suitable supporting plate 33 (FIG. 2) and it will be noted that the optical axis of the objective 32 passes through the film 24 or the like and the exposure window 9 for providing an image on the light-sensitive surface of the band 3.

Beneath the support 33 for the objective 32 is located part of a light-measuring assembly, this part of the assembly including a housing 34 and the structure located therein, and this structure is shown in detail in FIG. 4 as well as in FIG. 5. The housing 34 is carried by a support plate 35 and extends through a slot 37 in an intermediate partition 36 located within the tubular structure 31 of the machine.

As may be seen from FIGS. 4 and 5, the light-measuring assembly includes a light-conducting means in the form of a light-conducting plate 38 made of a material such as Lucite or the like which is capable of receiving light and conducting the light to a desired location. The light-measuring assembly also includes the photocells 39, 40, and 41 which form secondary-electron multipliers, and the light-conductive plate 38 is formed with three circular openings 42, 43, and 44 through which the tubes 39–41 respectively extend. These openings 42–44 are located adjacent an end of the light-conducting means 38 and are only slightly greater than the photocells 39–41 so that the light-conducting means extends into the region of the photocells.

At its end distant from the photocells, the light-conducting means 38 is formed with a circular opening 45 whose diameter is greater than the outer diameter of the housing of the objective 32. The housing 34 is formed in its lower wall 48 with an opening 46 and in its upper wall 49 with an opening 47, and the openings 45–47 are coaxial with each other and with the objective 32. The opening 46 is larger than the opening 45, as is clearly apparent from FIG. 5, so that a surface portion 50 of the light-conducting means 38 is not covered and, as is further described below, serves as a light-receiving surface.

The bottom wall 48 of the housing 34 serves also to support a bifurcated, shiftable cover plate 51 made of any suitable opaque material, as is the case with the housing 34, and the cover plate 51 is capable of having its position adjusted so that it will cover a selected portion of the surface 50. Thus, screws 52 and 53 are threaded into the wall 48 and pass through elongated slots 54 and 55, respectively, of the cover plate 51, and the heads of these screws 52 and 53 are of a larger diameter than the width of the slots so that these screws are capable of fixing the cover plate 51 in a selected position and are capable of being loosened so as to adjust the position of the cover plate 51. When the screws are loosened the plate 51 can be shifted radially with respect to the opening 45 of the light-conducting plate 38, so that a greater or lesser portion of the surface 50 will be covered.

The bottom wall 48 and the upper wall 49 of the housing 34 directly engage the plate 38 in the region of its opening 45 so that in this way it is possible to securely position the plate 38 in the housing 34 without any additional fastening or holding structure. In order to be able to maintain the bottom wall 48 of the housing 34 flat, although the photocells 39–41 extend through and beyond the openings 42–44 of the plate 38, the plate 38 is provided with a pair of end portions which are located in planes which are displaced from each other, which are parallel to each other, and which are normal to the optical axis, and these displaced portions of the plate 38 are interconnected by an intermediate portion 56 of the plate 38, so that in this way, as shown in FIG. 4, the photocells can be easily supported in the desired position with respect to the plate 38 while the bottom wall 48 of the housing 34 remains flat.

In the above-described embodiment of a light-measuring structure according to the present invention, with the exception of the cylindrical surface of the plate 38 which defines the opening 45 thereof, all of the exterior surfaces of the plate 38 are polished, and the cylindrical surface which defines the opening 45 is covered with a suitable white coating. The inner surfaces of the housing 34 are made so that they will reflect light while at the same time diffusing the light. Instead of such an arrangement it is, however, also possible to provide all exterior surfaces of the plate 38, with the exception of the light-receiving surface 50 and the cylindrical surfaces of the opening 42–44, with a matting or frosting, or these surfaces may also be provided with a white coating.

Finally, the uppermost wall of the housing 34 is provided with an opening 57 through which an unillustrated electrical conductor assembly extends in order to be connected electrically with the photocells 39–41 in the housing 34.

The above-described light-measuring structure is mounted in the apparatus in such a way that the central axis of the opening 45 of the plate 38 coincides with the optical axis of the objective 32 and the objective 32 extends into the opening 47 of the housing 34 and into the opening 45 of the plate 38 so that the plate 38 surrounds the objective 32, and, as is apparent from FIG. 3, the plate 38 is of an arcuate configuration around approximately one-half of the opening 45 at the side thereof which is distant from the photocells 39–41.

The light-measuring structure is removably mounted in the machine so that it can be removed and exchanged for another light-measuring structure. For this purpose the electrical connections to the photocells 39–41 can be disconnected, and after raising the objective 32 and removing the rear wall 58 of the tubular structure 31, it is a simple matter to move the housing 34 and the structure therein from the machine.

The photocell 39 is sensitive to red light, the photocell 40 is sensitive to green light, and the photocell 41 is sensitive to blue light. The photocells 39–41 are connected through well known exposure-controlling devices with the electromagnetic controls for the jalousie shutters 28–30 of the lamps 14–16, respectively. These exposure-controlling devices are located in a unit 59 which is detachably carried by the table 1 in the manner shown diagrammatically in FIG. 1. The exposure control devices of the unit 59 are capable of being adjusted to make corrections both for color and for density, and these corrections are introduced by actuating selected keys of the keyboard 5.

During use of the machine the lamps 14–16 are continuously energized and when an exposure is to be made the three jalousie shutters 28–30 are simultaneously opened so that the exposure of the copy paper 3 to red, green and blue light begins simultaneously. The three photocells 39–41 also receive light in a manner described in greater detail below. As soon as the photocell 39 which is sensitive to red light receives a predetermined amount of light which is preset by a key of the keyboard 5, the exposure control device which is connected to the photocell 39 and the shutter 28 closes the latter, and in this way exposure to red light is terminated. In an analogous manner the photocell 40 serves to actuate the structure for closing the shutter 29 when a predetermined amount of green light reaches the photocell 40. Also, when a predetermined amount of blue light is received by the photocell 41, the exposure control device connected thereto will automatically close the shutter 30. As soon as all three of the shutters 28–30 are closed, the exposure of the copy paper 3 is terminated, and it is advanced in a known way so as to provide the next reproduction.

The measuring of the light thus takes place simultaneously with the exposure of the copy paper 3. The lamps 14–16 together with the lenses and reflectors associated therewith form a light-directing means for directing light through the negative, transparency, diapositive or the like 24 and along the optical axis through the objective 32 in order to provide the desired image on the photographic copy paper 3, and thus the elements 14–16 and their associated lenses and reflectors form a light-directing means which is located at least in part along the optical axis for directing light through the objective 32. This light-directing means provides additional light which does not pass through the objective 32 but which is located in the immediate vicinity of the light passing through the objective 32, and the surface 50 of the light-conducting means 38 is located in the path of this additional light in order to receive this additional light, and the additional light which enters into the light-conducting plate 38 through its surface 50 is conducted to the photocells 39–41 by way of the diffuse reflection from the inner surfaces of the housing 34 and by way of the total reflection from the polished exterior surfaces of the plate 38.

It has been found that with the structure of the invention all parts of the film 24 or the like, insofar as they are uniformly illuminated and of uniform density, will influence the photocells 39–41 in the same way. Integration or measuring errors which might result from different distances between different parts of the negative or the like which is to be reproduced and the several photocells 39–41 are extremely small. By proper adjustment of the cover plate 51 and thus covering some of the portions of the surface 50 which are located closer to the photocells 39–41, it is possible to further reduce the integration errors.

The invention is not necessarily limited to the details of the structure disclosed above and shown in FIGS. 1–5. Thus, instead of a light-conducting means 38 which has a configuration shown in FIGS. 4 and 5, as well as in FIG 3, it is possible to provide a light-conducting plate 38a as shown in FIG. 6. With such a light-conducting means the openings 42–44, which respectively receive the photocells 39–41, extend horizontally with their axes respectively perpendicular to the axis of the opening 45.

It is possible to omit the opening 45 in the plate 38 or 38a if the openings 46 and 47 in the bottom wall 48 and top wall 49 of the housing 34 are retained, and in this case it is of course desirable to make the plate 38 or 38a of a material which will have characteristics suitable for the optical characteristics of the particular objective 32. It is also possible to construct the plate 38 or 38a, in its region between the openings 46 and 47 of the housing 34, as a lens, so that in this case the part of the plate 38 or 38a through which the light which passes through the objective 32 passes can simultaneously serve as the objective itself or as a part of the objective.

While it is preferred to have the plate 38 surrounding the objective 32, such a construction is not essential. Thus, it is possible to situate the part of the light-measuring structure which is in the vicinity of the optical axis at a position axially spaced from and located between the objective 32 and the film 24, but in this case the openings 45–47 in the plate 38 and housing 34, through which the light passes, should be made larger.

In order to screen out daylight from the photocells 39–41 so that these photocells are not influenced by such light when the machine is not in use, there can be located within the tube 31 beneath the light-measuring structure a turnable covering plate which is turned to an open position when the operations are commenced, and which is returned back to its closed position at the end of the exposure operations.

Of course, the light-measuring structure of the invention is not limited to use with a machine for providing color photographic reproductions, and this structure of the invention can of course also be used with a device for making black and white photographic reproductions, in which case only one photocell would be used. Also, the light-measuring structure of the invention can be used in devices where the exposure adjustments are made before the exposure rather than during the exposure. Also, the structure of the invention can be used with photographic devices other than enlargers or the like which are used to make photographic reproductions. For example, the structure of the invention can be used with motion picture or still picture projectors where the brightness of the projected image is automatically regulated in accordance with the density of the negative, diapositive, transparency, or the like, so as to provide projected images of constant light intensity irrespective of variations in density of the film, such controls being automatically provided by photoelectric devices which measure the light passing through the film and automatically control the projector so as to adjust the light intensity of the projected image.

It is apparent from the above description and the drawings that the light-measuring structure occupies a small amount of space and is of a simple construction and can easily and quickly be mounted on or removed from a photographic apparatus without substantially increasing the size thereof. Moreover, in spite of different distances between individual parts of the image which is to be reproduced or projected and the several photocells, it is possible to provide an extremely accurate light-measurement, with all parts of the film which are uniformly illuminated providing uniform actuation of the photocells. Of course, this result is obtained with the structure of the invention even in the case where color reproducing devices having a plurality of photocells are used.

It will be understood that each of the elements described above, or two or more together, may also find a useful application in other types of light-measuring assemblies differing from the types described above.

While the invention has been illustrated and described as embodied in automatic light-measuring assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a light-measuring assembly for a photographic device, in combination, an objective; light-directing means including a source of light, said light directing means positioned at least in part along the optical axis of said objective for directing light from said source through said objective, and said light-directing means also directing additional light from said source to the region of the outer periphery of said objective in the immediate vicinity of the light which passes through said objective; a photocell located at a position spaced laterally from the optical axis of said objective; and light-conducting means extending from said photocell into the path of said additional light for conducting at least some of the additional light to said photocell whereby the latter may participate in a measurement of the light directed by said light-directing means through said objective.

2. In a light-measuring assembly for a photographic device, in combination, an objective; light-directing means including a source of light, said light directing means positioned at least in part along the optical axis of said objective for directing light from said source through said objective and said light-directing means also directing additional light from said source to the region of the outer periphery of said objective in the immediate vicinity of the light which passes through said objective; a photocell located at a position spaced laterally from the optical axis of said objective; and light-conducting means extending from said photocell into the path of said additional light for conducting at least some of the additional light to said photocell whereby the latter may participate in a measurement of the light directed by said light-directing means through said objective, said light-conducting means being formed with a cutout through which passes the light which is directed through said objective.

3. In a light-measuring assembly for a photographic device, in combination, an objective; light-directing means including a source of light, said light directing means located at least in part along the optical axis of said objective for directing light from said source through said objective, and said light-directing means also directing additional light from said source to the region of the outer periphery of said objective in the immediate vicinity of the light which passes through said objective; a photocell laterally spaced from the optical axis of said objective; and light-conducting means extending from the region of said photocell to the path of said additional light for receiving the additional light and conducting the same to said photocell so that said photocell can participate in light-measuring operations, said light-conducting means being formed with an opening through which the optical axis passes and through which the light directed through said objective also passes, and said light-conducting means having an arcuate configuration extending part of the way around said opening on one side thereof.

4. In a light-measuring assembly for a photographic apparatus, in combination, an objective; light-directing means including a source of light, said light directing means located at least in part along the optical axis of said objective for directing light from said source through said objective, and said light-directing means also directing additional light from said source to the region of the outer periphery of said objective in the immediate vicinity of the light which passes through said objective; a photocell laterally spaced from the optical axis; and light-conducting means extending from the region of said photocell into the path of said additional light for conducting the additional light to said photocell so that said photocell may participate in light-measuring operations, said light-conducting means including a housing and a light-conducting plate located in said housing.

5. In a light-measuring assembly for a photographic apparatus, in combination, an objective; light-directing means including a source of light, said light directing means located at least in part along the optical axis of said objective for directing light from said source through said objective, and said light directing means also directing additional light in the immediate vicinity of the light which passes through said objective; a photocell laterally spaced from the optical axis; and light-conducting means formed with an opening in which said photocell is located and extending from said opening into the path of the additional light for conducting at least some of the additional light to said photocell so that said photocell can participate in light-measuring operations.

6. In a light-measuring assembly for photographic apparatus, in combination, an objective; light-directing means including a source of light, said light directing means located at least in part along the optical axis of said objective for directing light therethrough from said source and said light-directing means also directing additional light from said source to the region of the outer periphery of said objective in the immediate vicinity of the light which passes through said objective; a photocell laterally spaced from the optical axis; and light-conducting means extending from the region of said photocell into the path of the additional light for receiving the additional light and conducting the same to said photocell so that said photocell may participate in the light-measuring operations, said light-conducting means including a housing in which the photocell is located and also including a light-conducting plate which is located at least partly within said housing.

7. In a light-measuring assembly for photographic apparatus, in combination, an objective; light-directing means including a source of light, said light directing means located at least in part along the optical axis of said objective for directing light therethrough from said source and said light-directing means adapted to also direct additional light from said source to the region of the outer periphery of said objective in the immediate vicinity of the light which passes through said objective; a photocell laterally spaced from the optical axis; and light-conducting means extending from the region of said photocell into the path of the additional light for receiving the latter and conducting the same to said photocell so that the latter may participate in the light-measuring operations, said light-conducting means including an elongated light-conducting plate having a pair of spaced portions which are respectively located in a pair of parallel planes which are displaced from each other.

8. In a light-measuring assembly for photographic apparatus, in combination, an objective; light-directing means including a source of light, said light directing means located at least in part along the optical axis of said objective for directing light therethrough from said source and said light-directing means adapted to also direct additional light from said source to the region of the outer periphery of said objective in the immediate vicinity of the light which passes through said objective; a photocell laterally spaced from the optical axis; and light-conducting means extending from the region of said photocell into the path of the additional light for receiving the latter and conducting the same to said photocell so that the latter may participate in the light-measuring operations, said light-conducting means including an elongated light-conducting plate having a pair of spaced portions which are respectively located in a pair of parallel planes which are displaced from each other, said planes being normal to the optical axis.

9. In a light-measuring assembly for photographic apparatus, in combination, an objective; light-directing means including a source of light, said light directing means located along the optical axis of said objective for directing light from said source through said objective, and said light-directing means adapted to direct additional light from said source to the region of the outer periphery of said objective in the immediate vicinity of the light which passes through the objective; a photocell laterally spaced from the optical axis; and light-conducting means extending from the region of said photocell into the path of the additional light for receiving the additional light and conducting the same to said photocell so that said photocell can participate in light-measuring operations, said light-conducting means carrying an opaque cover plate which partially covers a portion of said light-conducting means which is located in the path of the additional light.

10. In a light-measuring assembly for photographic apparatus, in combination, an objective; light-directing means including a source of light, said light directing means located along the optical axis of said objective for directing light from said source through said objective, said light-directing means adapted to direct additional light from said source to the region of the outer periphery of said objective in the immediate vicinity of the light which passes through the objective; a photocell laterally spaced from the optical axis; and light-conducting means extending from the region of said photocell into the path of the additional light for receiving the additional light and conducting the same to said photocell so that said photocell can participate in light-measuring operations, said light-conducting means carrying an opaque cover plate which partially covers a portion of said light-conducting means which is located in the path of the additional light, said cover plate having a bifurcated configuration and being adjustably connected to the remainder of the light-conducting means so that the extent to which said cover plate prevents the additional light from entering said light-conducting means can be adjusted.

11. In a light-measuring assembly for photographic apparatus, in combination, an objective; light-directing means including a source of light, said light directing means located at least in part along the optical axis of the objective for directing light from said source through said objective, and said light-directing means adapted to direct additional light from said source to the region of the outer periphery of said objective in the immediate vicinity of the light which passes through said objective; a photocell laterally spaced from the optical axis; and light-conducting means extending from the region of said photocell into the path of the additional light for receiving at least some of the additional light and conducting the same to said photocell so that the latter can participate in light-measuring operations, said light-conducting means surrounding said objective.

12. In a light measuring assembly for a photographic device, in combination, an objective; means for supporting a transparency located along the optical axis of said objective; light-directing means including a source of light, said light directing means located at least partly along said optical axis of said objective for directing light from said source through said transparency so that the modulated light emanating from said transparency passes mainly through said objective, with the remaining portion of said modulated light passing toward the region of the outer periphery of said objective and in the immediate vicinity of the light which passes through said objective; a photocell located at a position spaced laterally from the optical axis of said objective; and light conducting means extending from said photocell into the path of said additional light for conducting at least some of the additional light to said photocell, whereby the latter may participate in measurement of the light directed by said light directing means through said transparency.

13. In a light measuring assembly for a photographic apparatus, in combination, an objective; light-directing means located at least in part along the optical axis of said objective for directing a light beam in direction toward said objective; photoelectric sensing means located out of the path of said light beam; and a one piece light conducting member having a portion surrounding the major part of said light beam at one location along said path and extending partly into the path of said light beam for directing light from the same toward said photocell so that said photocell can participate in measuring the light emitted by said light directing means.

References Cited by the Examiner
UNITED STATES PATENTS

| | | | |
|---|---|---|---|
| 2,759,601 | 8/1956 | Baigent | 88—14 |
| 2,759,602 | 8/1956 | Baigent | 88—14 |
| 2,804,550 | 8/1957 | Artzt | 250—217 |
| 3,114,283 | 12/1963 | Gruner | 88—24 |

NORTON ANSHER, *Primary Examiner.*

RICHARD A. WINTERCORN, *Assistant Examiner.*